United States Patent
Friedman

(10) Patent No.: US 8,689,485 B2
(45) Date of Patent: Apr. 8, 2014

(54) VERTICAL PLANTER AND GARDENING WALL

(75) Inventor: Jared Friedman, Roslyn Heights, NY (US)

(73) Assignee: Inventurous, LLC, Pittsburgh, PA (US)

( * ) Notice: Subject to any disclaimer, the term of this patent is extended or adjusted under 35 U.S.C. 154(b) by 168 days.

(21) Appl. No.: 13/325,775

(22) Filed: Dec. 14, 2011

(65) Prior Publication Data

US 2012/0180388 A1 Jul. 19, 2012

Related U.S. Application Data

(60) Provisional application No. 61/423,256, filed on Dec. 15, 2010.

(51) Int. Cl.
*A01G 9/02* (2006.01)

(52) U.S. Cl.
USPC .................................................. 47/83; 47/82

(58) Field of Classification Search
USPC ................... 47/65.5, 82, 83, 85–87; 248/146
See application file for complete search history.

(56) References Cited

U.S. PATENT DOCUMENTS

| | | | | |
|---|---|---|---|---|
| 3,389,499 A * | 6/1968 | Haile | ................................ | 47/33 |
| 3,686,791 A * | 8/1972 | Mills | ................................ | 47/83 |
| 4,658,541 A * | 4/1987 | Haile | ................................ | 47/83 |
| 5,309,671 A * | 5/1994 | Byun | ................................ | 47/83 |
| 5,511,342 A * | 4/1996 | Maso | ................................ | 47/83 |
| 5,601,384 A * | 2/1997 | Dawson | ........................ | 405/284 |
| 6,612,073 B1 * | 9/2003 | Powell et al. | ..................... | 47/83 |
| 6,840,008 B1 * | 1/2005 | Bullock et al. | .................... | 47/82 |
| 7,690,151 B2 * | 4/2010 | Wilkes | ............................... | 47/82 |

FOREIGN PATENT DOCUMENTS

GB    2230413 A * 10/1990   ............... A01G 9/02

* cited by examiner

*Primary Examiner* — David Parsley
*Assistant Examiner* — Danielle Clerkley
(74) *Attorney, Agent, or Firm* — Inventurous, LLC

(57) ABSTRACT

A vertical planter and gardening wall comprised of base planter blocks that are identical to each other and end blocks that are identical to each other. The blocks are stackable and interlock. The invention can be used by gardeners to cultivate and display their gardens indoors or outdoors in a restricted area.

4 Claims, 6 Drawing Sheets

VERTICAL PLANTER AND GARDENING WALL

CROSS-REFERENCE TO RELATED APPLICATIONS

The present application claims the benefit of U.S. Provisional Application No. 61/423,256, filed Dec. 15, 2010, which is hereby incorporated by reference in its entirety.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

INCORPORATION-BY-REFERENCE OF MATERIAL SUBMITTED ON A COMPACT DISC

Not applicable.

BACKGROUND OF THE INVENTION (1) Field of the Invention

Vertical gardening allows gardeners to cultivate and display their flower, spice, and vegetable plants in very limited spaces or what would otherwise be untenable gardening locations.

(2) Description of Related Art including information disclosed under 37 CFR 1.97 and 1.98

Vertical gardens are becoming increasingly popular in peoples' homes, both in their houses and in limited outdoor areas, as people move towards urban areas and desire to grow their own food. Vertical gardens began as an experiment in 1988. Gardeners frustrated with little outdoor space could make the most of their space with a vertical garden. Today, companies sell ready-made systems and all-in-one kits for gardeners who want to have gardens in small spaces at home.

The costs and aesthetics of many existing systems lack appeal to consumers. The present invention creates a vertical gardening system that is cost-effective, has the ability to be mass-produced, and is aesthetically pleasing.

The prior art reference "The Vertical Garden" is a modular planter that has blocks that are arranged in a circular formation. The present invention's blocks are arranged in a linear formation. The Vertical Garden can only stack up to six levels high and cannot expand horizontally. The Vertical Garden can also be hung on a wall. The Vertical Garden is intended to stack the blocks only vertically and not horizontally. The Vertical Garden advertises that "you use vertical space to stack, hang and plant, saving your horizontal space." The present invention can stack up to ten blocks high and unlimited blocks wide, enabling it to also serve as a wall. The Vertical Garden cannot serve as a wall. The present invention is not intended to be hung on a wall. The Vertical Garden's blocks are for smaller scale use than the present invention's blocks.

The "Grow Wall" prior art reference does not feature interlocking blocks. The Grow Wall is comprised of several individual compartments that are separately secured in a holder. The compartments do not touch each other and are not connected to each other.

The inventor's prior art reference "Advancing the Vertical Garden" refers to the present invention. The abstract is from a poster presentation symposium at Carnegie Mellon University.

BRIEF SUMMARY OF THE INVENTION

A vertical planter which may be formed into a wall containing multiple planting spaces which may be utilized for different types of plants in a restricted area.

BRIEF DESCRIPTION OF THE SEVERAL VIEWS OF THE DRAWING(S)

DETAILED DESCRIPTION OF THE INVENTION

Figure 4:
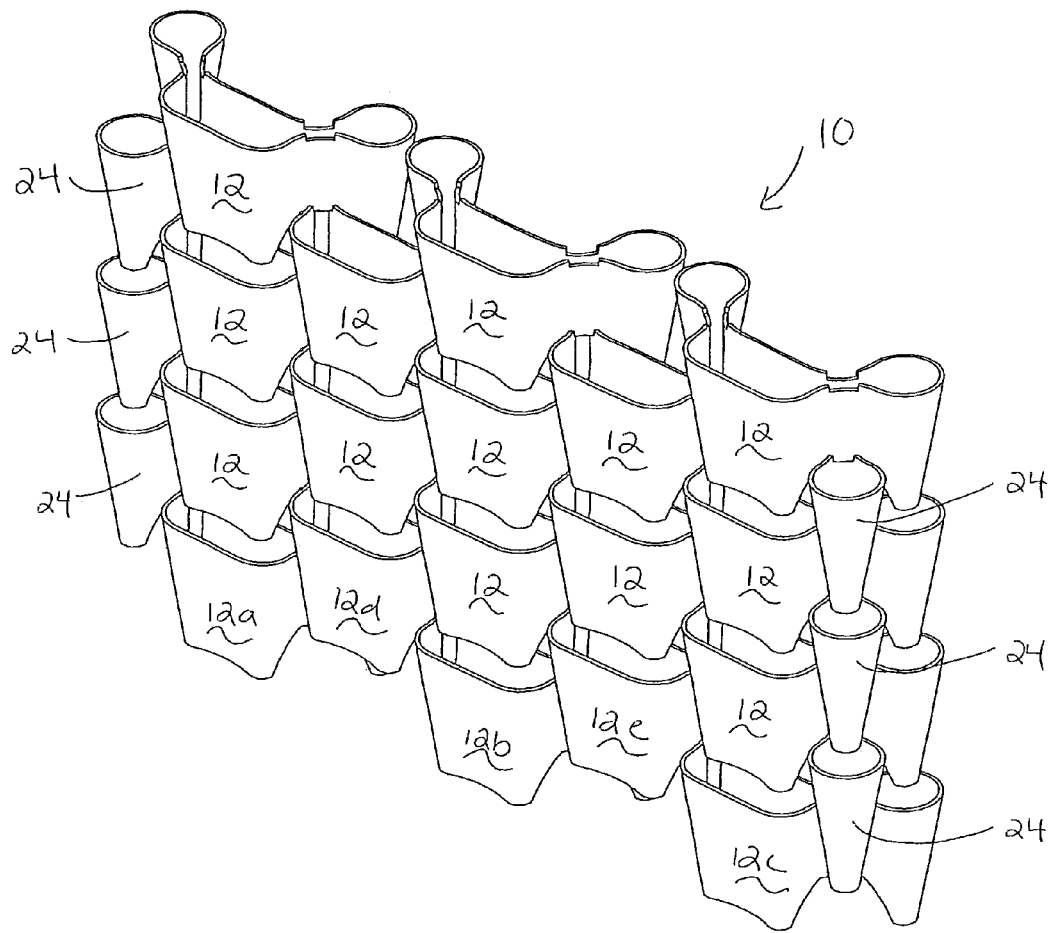
FIG. 4 is a perspective view from the front of a vertical gardening wall.

FIG. 4 shows a stackable planter wall made from base planter blocks 12.

It will be seen that a smaller planter consisting of three basic blocks can be made by combining planter blocks 12a, 12b, and 12d. An enlarged planter can be formed by using 12a, 12b, 12c, 12d, and 12e. A wall can be formed by using multiple base planter blocks 12 and end blocks 24 which are stacked as shown in FIG. 4.

Figure 1:
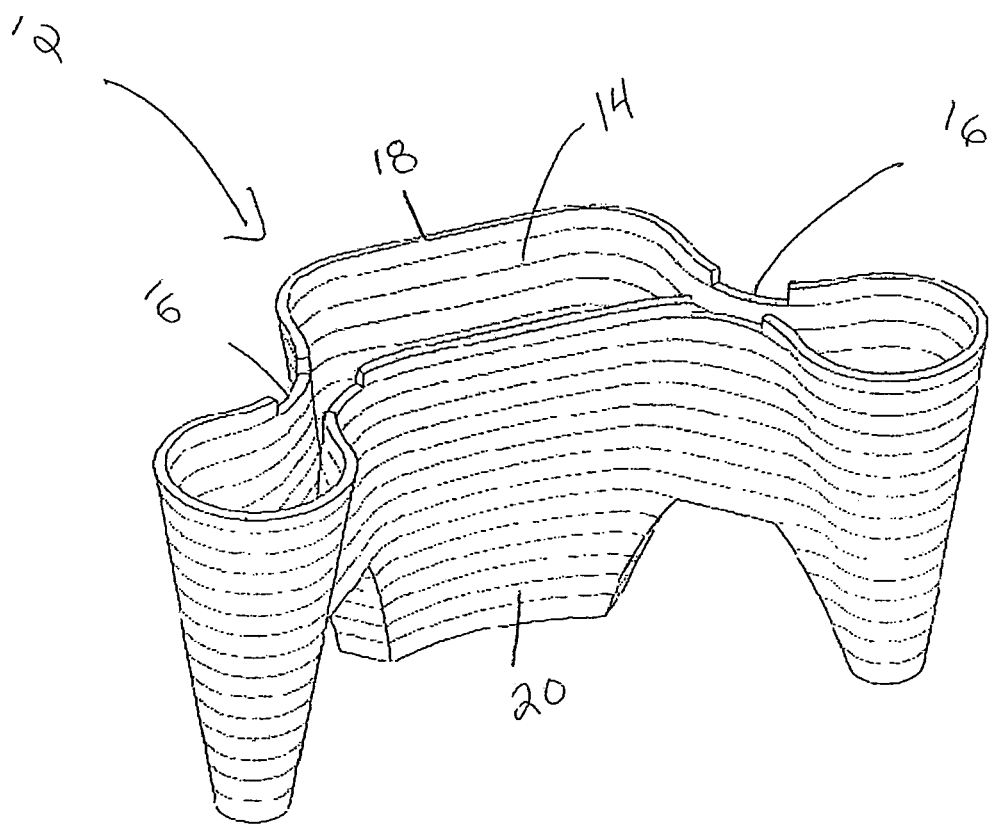
FIG. 1 is a perspective view from the rear of a basic building block of the present invention.
Figure 2:
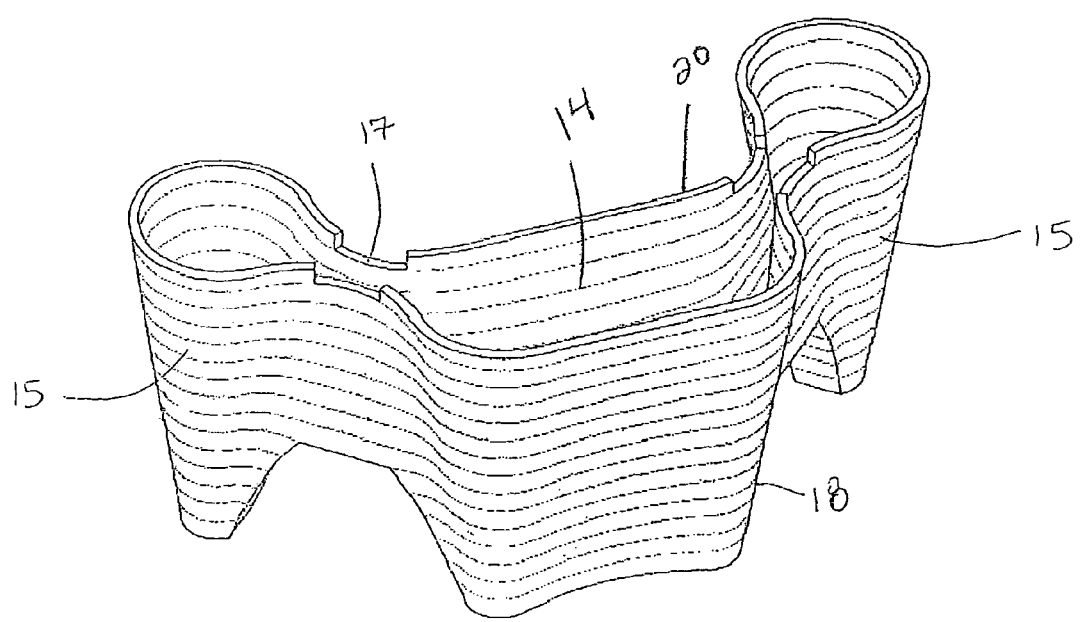
FIG. 2 is a perspective view from the front of the basic building block of the present invention.
Figure 3:
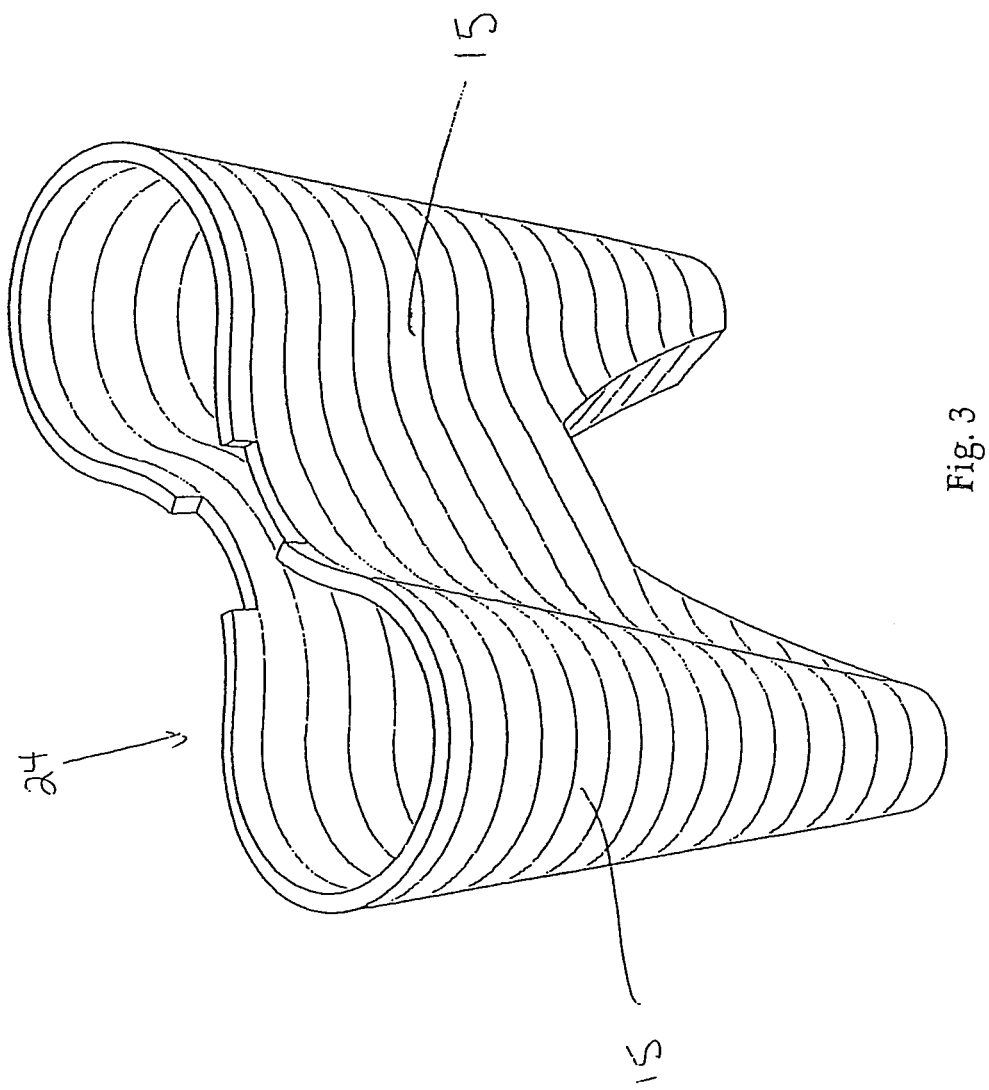
FIG. 3 is a perspective view of an end block of the present invention.
Figure 5:
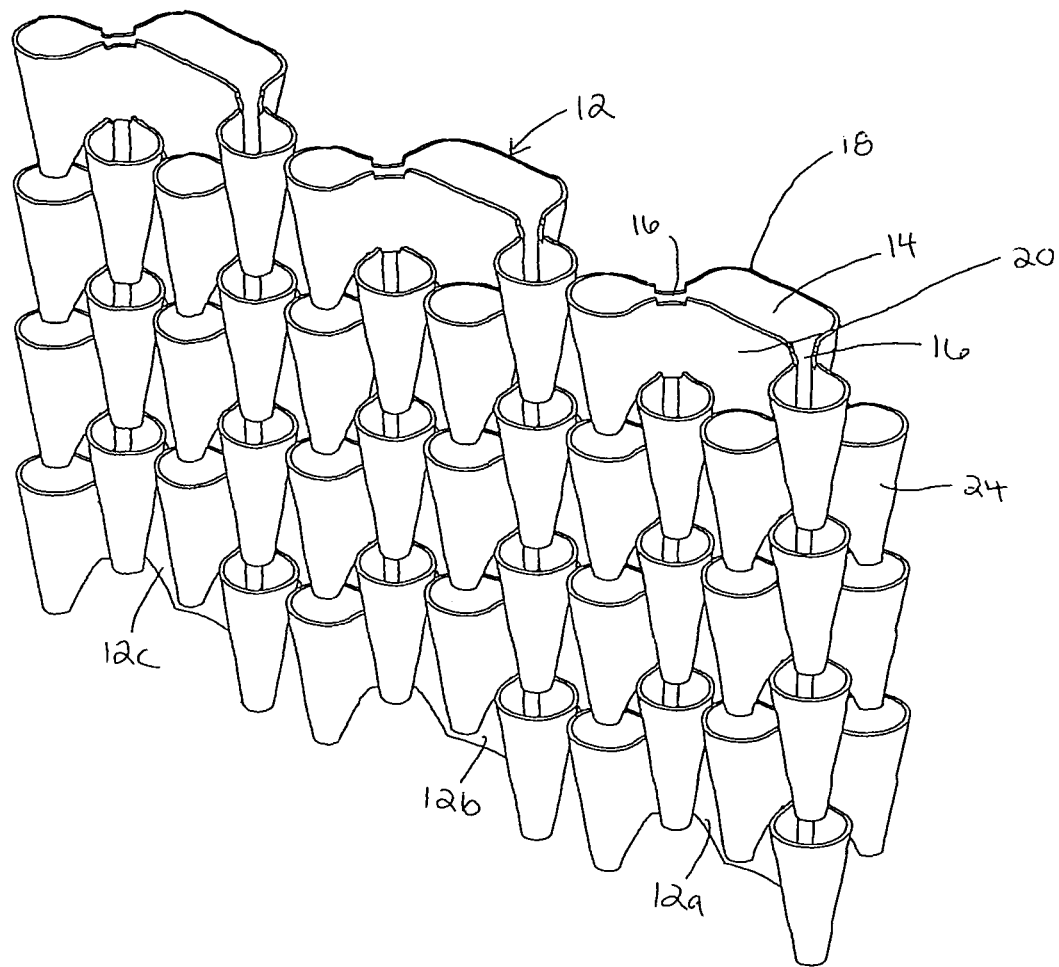
FIG. 5 is a perspective view from the back of the vertical gardening wall.
Figures 6, 7:
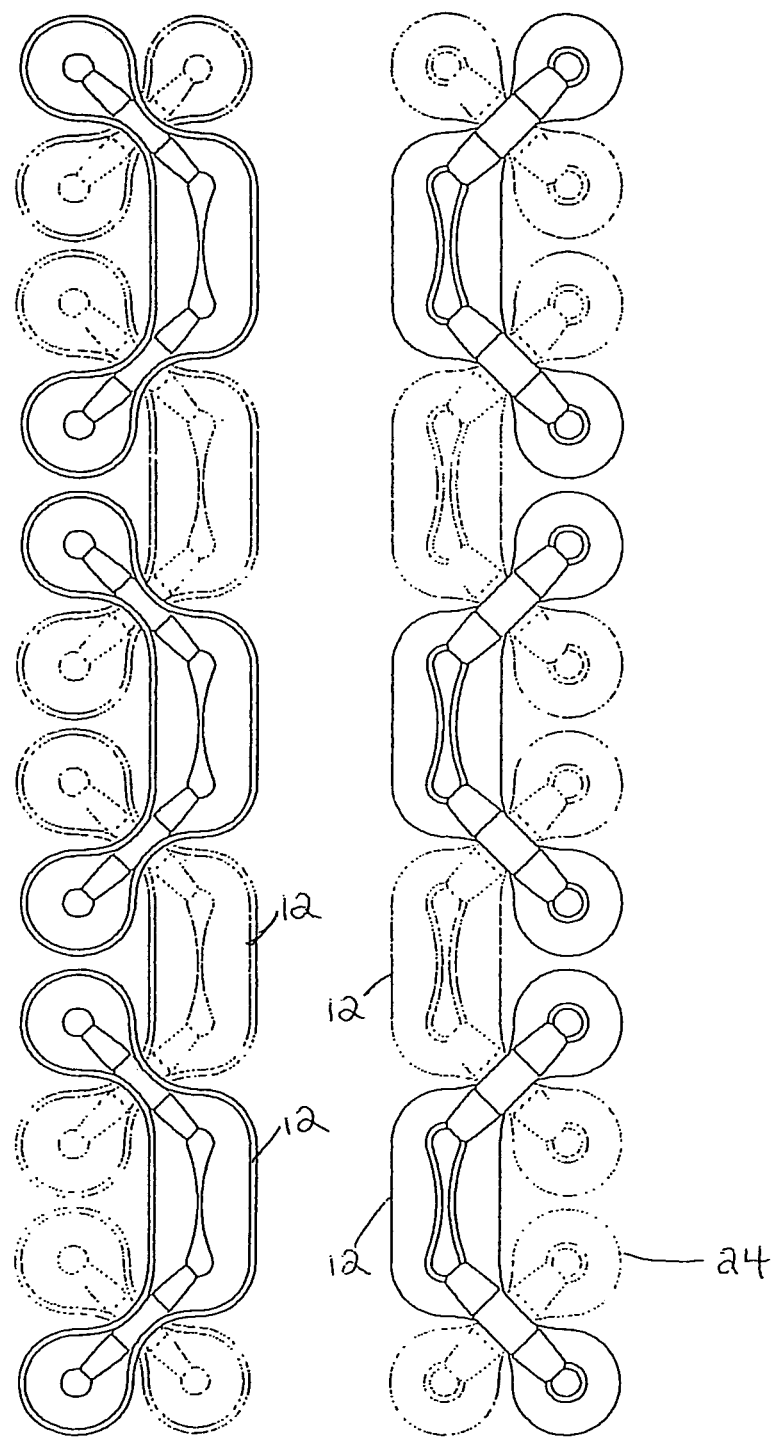
FIG. 6 is a top view of a vertical gardening wall.
FIG. 7 is a bottom view of a vertical gardening wall.

FIG. 1 shows a base planter block 12 having a plant receiving body 14 and a block supporting section 16. The block supporting section 16 is connected to a generally conical end piece 15 and receives other blocks in the stacking notches 17 of the supporting section 16. FIG. 3 shows an end block 24 that has two generally conical end pieces 15 joined by a block supporting section 16 with a stacking notch 17. Referring to FIGS. 1 and 2, the plant receiving body 14 has a front wall 18 and a rear wall 20. As can be seen in FIGS. 4 and 5, a vertical wall may be formed by stacking basic blocks 12 upon one another and utilizing the end blocks 24 to support unsupported ends of basic blocks 12. As may be seen in FIGS. 6 and 7, the basic blocks 12 have their plant receiving bodies 14 staggered in alternate rows with the end blocks 24 supporting unsupported ends of base planter blocks 12.

The present invention may be constructed by molding material in a conventional fashion. It may also use an unconventional 7-axis robotic fabrication process. The present invention may use a 7-axis robotic fabrication process to make molds that are milled and then cast to create self-supporting, stackable planters. The 7-axis robotic fabrication method is typically confined to the automobile industry, but can be utilized for this system for architectural and aesthetic purposes. In the 7-axis configuration, the robot has six different joints that can rotate, allowing the robot to move and cut at various angles. The seventh axis is the table where the material that is to be cut for the mold, such as foam blocks, rests. The table can rotate, which adds the last axis to the process, making it a 7-axis robot. A drill bit can be used at the end of the robot to cut patterns into foam blocks to create molds. The molds can be created using a "Swarfing" cut where the bit moves along a predefined path which creates a groove in the material. The planters can be made of concrete. The width of the bit determines the thickness of the concrete used to make the planters. The molds can then be used to cast the concrete.

The stackable planters can be used as a decorative wall or a retaining wall and can be for outdoor or indoor use. The invention is weather resistant and can be kept outdoors during winter months.

The design of the bases can be varied and the system can be expanded by adding more planters to the wall of planters. Because of the design of the planters and their inter-locking qualities, the wall is stable. The vertical configurations are adaptable to small balconies, porches, walkways, windowsills, and any other small space. The planters are elevated off of the ground, which keeps it away from pests.

The invention also has the advantage that watering the garden from the top planters allows water to flow to the bottom planters, which enables watering of the bottom planters without additional watering by the gardener. The bottom level of planters could have plug stoppers if water cannot or should not drain out of the bottom planters due to where the gardener places the planters in their home. The stoppers could be rubber stoppers that plug the bottom. An advantage of using rubber stoppers is that if the gardener is placing this on a porch deck or some surface that they may not want to scratch, or if the gardener is using the system indoors, the rubber bottom could prevent the system from scratching the supporting surface.

The preferred embodiment is planters and walls made of concrete components. Planters and walls could also be made from High Impact Polystyrene (HIPS), High Density Polyethylene (HDPE), which is recyclable (#2 plastic), Polypropylene, which is also recyclable (#5 plastic), or Polyurethane, which could be made from Natural Oil Polyols and is a greener alternative. The most common materials for the pots are Polyurethane and Polyethylene. One advantage with the Polyurethane is that since it is a light foam material, the same materials that are used to insulate walls, if the planter is put against the exterior of a house, it has the potential to act as an insulator. An advantage with Polyethylene is that since it is a #2 plastic, it is easy to recycle. As far as the eco-friendly aspects of each of the plastics, they all can potentially be made in environmentally conscious ways depending on the manufacturer.

Various changes could be made in the above construction and method without departing from the scope of the invention as defined in the claims below. It is intended that all matter contained in the paragraphs above, as shown in the accompanying drawings, shall be interpreted as illustrative and not as a limitation.

I claim:

1. A vertical planter for cultivating plants, comprising a plurality of planter blocks, each planter block comprising:
    a plant receiver block that is open at the top and having a rectangular cross-sectional shape and a depth sufficient to hold a plant;
    and two conical end pieces, each having a wide top opening and walls that taper downwardly to a narrow bottom portion to a depth similar to the depth of the plant receiver block having a bottom portion, where the conical end pieces are in fluid connection with the planter receiver block through two support sections, where one support section emanates at an angle from a rear corner of the plant receiver block and the other support section emanates at the angle from an opposite rear corner of the plant receiver block;
    where the plant receiver block, the two conical end pieces and two support sections share a continuous top edge, also where the height of the plant receiver block top edge and the height of the two conical end pieces top edges are approximately the same;
    where the top edge of the support sections is recessed from top edges of the plant receiver block and conical end pieces;
and where the support sections have a depth that is less than the depth of the plant receiver block and the depth of the conical end pieces such that the bottom portions of the plant receiver block and the conical end pieces extend below the support sections.

2. The vertical planter of claim 1, where the plurality of planter blocks are arranged as a stacked nest with a pattern of planter blocks where two lower planter blocks support an upper planter block through the support sections of the upper planter block resting on the support sections of the lower planter blocks to form an interlocking assembly of planter blocks.

3. The vertical planter of claim 2, where the conical end pieces of the top planter block include a hole in the bottom of the conical end pieces that allows fluids to drain from the top planter block to lower planter blocks.

4. The vertical planter of claim 2, where the plant receiver block of the top planter block includes a hole in the bottom of the top planter block that allows fluids to drain from the top planter block to lower planter blocks.

* * * * *